UNITED STATES PATENT OFFICE.

JOHN WILKERSON LOWMAN AND NEAL MACK GAGE, OF WARRINGTON, FLORIDA.

PAINT.

SPECIFICATION forming part of Letters Patent No. 614,403, dated November 15, 1898.

Application filed November 5, 1897. Serial No. 657,544. (No specimens.)

*To all whom it may concern:*

Be it known that we, JOHN WILKERSON LOWMAN and NEAL MACK GAGE, citizens of the United States, and residing at Warrington, in the county of Escambia and State of Florida, have invented a certain new and useful Composition of Matter for Use as a Paint for General Purposes, of which the following is a full and complete specification, such as will enable those skilled in the art to which it appertains to make and use the same.

The object of this invention is to provide a paint for general use and which can be used without a drier; which can also be used without any danger to the health of the painter or occupants of newly-painted rooms, it being highly impregnated with the medicinal property of pine; which is very healthful; which also possesses a large percentage of creosote, by which it is rendered a perfect insecticide, and which by the use of any waterproof filler is made a certain toredo-proof paint, a further object being to provide a paint which can be used in a boiling state either on iron or wood, which renders it doubly effective in painting the hulls of ships or other vessels, and which can also be used upon furniture as an oil and which is a proof against bedbugs and other vermin, a further object being to provide a paint which by the addition of any oil in small quantities containing an abundance of oleic acid is rendered rustproof and can be used to protect steel and iron vessels and other articles from rusting and which is also a quick drier and which makes by itself a fine hard oil-finish.

Our improved paint consists of a composition composed of the following ingredients, combined in the following proportions: pine-tar, two parts; methylic alcohol, one part; creosote, three parts; turpentine, two parts; picamar, one part; capnomor, one part; pittacal, one part; paraffin-oil, four parts; eupion-oil, one part; cedar-oil, one part. These ingredients are thoroughly mixed in the usual or any preferred manner, and in practice, when ready for use, we add thereto three parts of any suitable filler, the filler employed depending upon the color, shade, or hardness desired.

We do not confine ourselves to the exact amount of the filler employed, for the reason that in certain cases it may be necessary to add to or diminish the amount above specified, according to the use to which the paint is to be put or the material to which it is to be applied, and it will be apparent that the proportionate parts of the ingredients specified herein may be changed to some extent without departing from the spirit of our invention, and in some cases we may omit the turpentine and methylic alcohol.

Having fully described our invention, we claim as new and desire to secure by Letters Patent—

1. A composition for use as a paint, said composition consisting of the following ingredients, pine-tar, methylic alcohol, paraffin-oil, eupion-oil, picamar, capnomor, pittacal, creosote, cedar-oil, and turpentine, combined in the proportions specified.

2. A composition of matter for use as a paint, consisting of the following ingredients, pine-tar two parts; methylic alcohol one part; paraffin-oil four parts; eupion-oil one part; picamar one part; capnomor one part; pittacal one part, creosote three parts; cedar-oil one part, turpentine two parts.

3. A composition for use as a paint containing the following ingredients, pine-tar, paraffin-oil, eupion-oil, picamar, capnomor, pittacal, creosote and cedar-oil.

In testimony that we claim the foregoing as our invention we have signed our names, in presence of the subscribing witnesses, this 30th day of October, 1897.

JOHN WILKERSON LOWMAN.
NEAL MACK GAGE.

Witnesses:
JOHN EAGAN,
RICHARD POPE REESE.